Feb. 18, 1969     S. R. CURTIS     3,427,774
GROOVED BRICK CONSTRUCTION AND COMPOSITE THEREOF
Filed Oct. 5, 1965
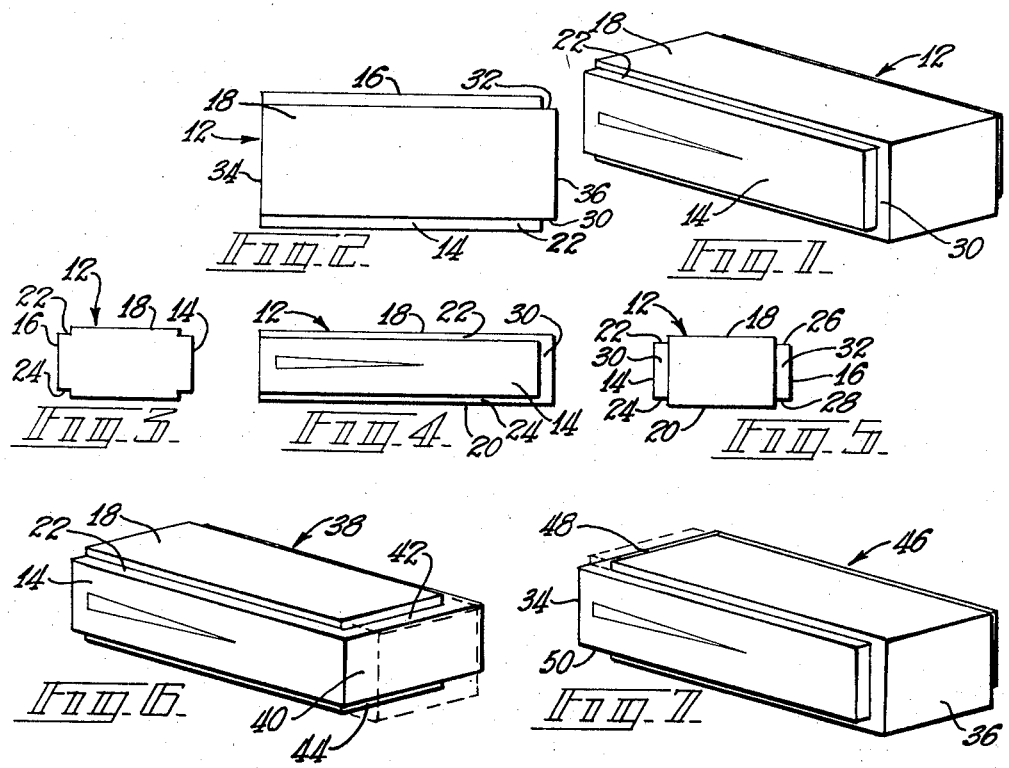
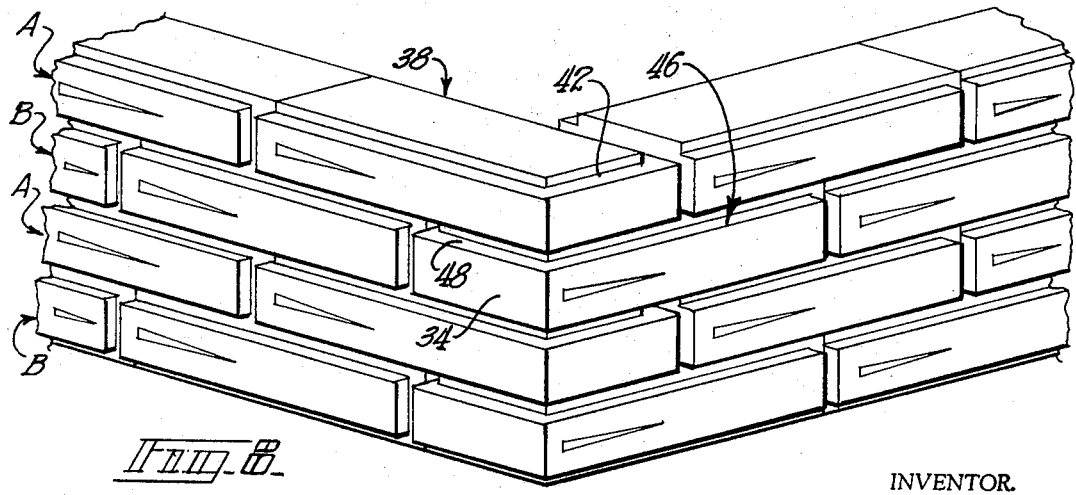
INVENTOR.
STANLEY R. CURTIS
BY
ATTORNEY

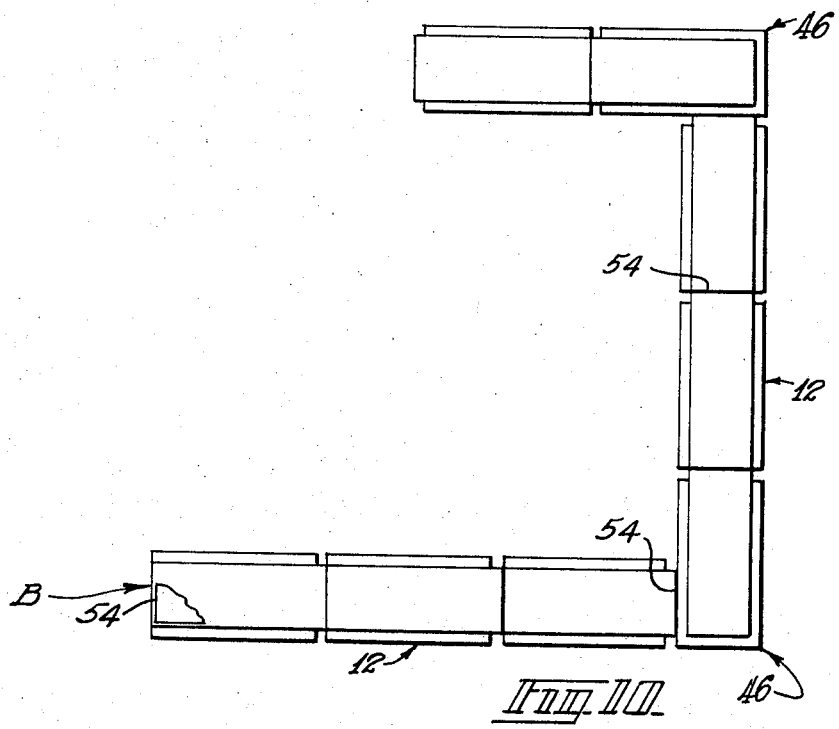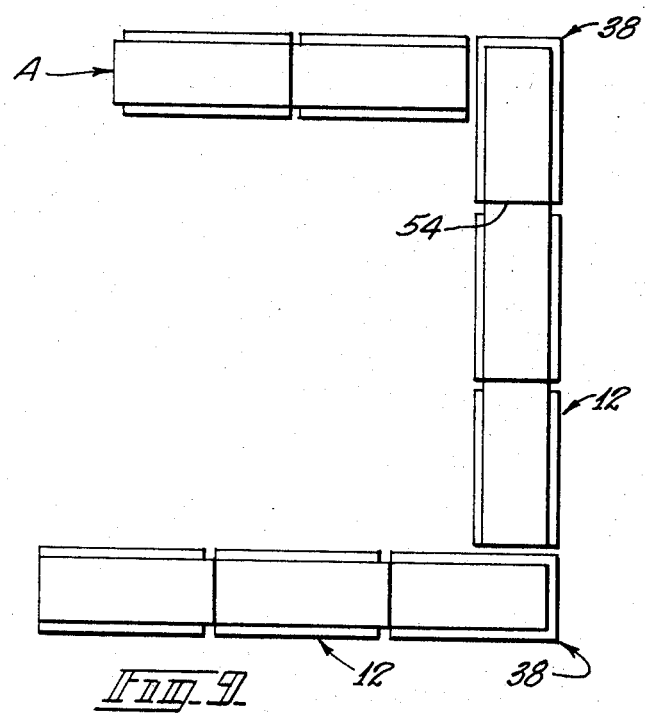

United States Patent Office 3,427,774
Patented Feb. 18, 1969

3,427,774
GROOVED BRICK CONSTRUCTION
AND COMPOSITE THEREOF
Stanley R. Curtis, Toledo, Ohio, assignor to Tru-Lay Masonry Products Corporation, Toledo, Ohio, a corporation of Ohio
Continuation-in-part of application Ser. No. 429,952, Jan. 27, 1965. This application Oct. 5, 1965, Ser. No. 493,213
U.S. Cl. 52—284                          5 Claims
Int. Cl. E04c 1/04, 2/04; E04b 2/64

ABSTRACT OF THE DISCLOSURE

A brick and a wall made with the brick employ a thin bonding agent between the courses of brick so that a wall can be laid with relatively little skill. The brick can be provided in three forms, a stretcher brick and two types of corner brick which enable the bricks to be laid with uniform grooves therebetween and with the bricks at uniform levels, even when each brick is slightly thicker at one end.

---

This application is a continuation-in-part application of my co-pending application Ser. No. 429,952, filed on Jan. 27, 1965, which is a continuation-in-part of my application Ser. No. 264,014 which, in turn, is a continuation-in-part of my application Ser. No. 104,178, all now abandoned.

This invention relates to an improved brick and to a method of laying the same. More particularly, the invention relates to bricks and a brick wall which have the appearance of conventional bricks and brick walls when laid, and yet have several advantages over conventional ones.

Almost every aspect of house construction and maintenance has been invaded by the "do-it-yourself" concept. Bricklaying, however, as known for the past several centuries, has required a considerable amount of skill and experience and has always been considered beyond the skill of the layman. The laying of conventional bricks, which are shaped as right quadrangular prisms, is particularly difficult because they are laid on a thick bed of mortar deposited on each course to assure adequate structural adhesion between the bricks. A thick bed has always been used because conventional clay bricks have irregular surfaces, with the result that portions of the surfaces of adjacent bricks may touch if the bricks are laid with a thin bed of mortar therebetween. In such an instance, a structural weakness occurs at these portions because there is no mortar therebetween to provide proper structural adhesion. Therefore, the thick bed of mortar is required to assure that mortar will always be located between all portions of the adjacent bricks, including the irregular portions which would otherwise touch if the bricks were closer together. Of course, while all bricks do not have irregular portions of this nature, nevertheless, a thick bed of mortar is always used between at least most all bricks in the interest of uniformity, in order to maintain the bricks in aligned rows and in a regular pattern. Thus, even if only a small number of bricks in a wall were irregular so as to require a thick bed of mortar, still the whole wall would have to be laid with the thick mortar beds.

The thick mortar bed inherent in bricklaying is by far the principal factor necessitating the employment of a high degree of skill to build a structure of brick. The mortar used in the thick bed must be of proper consistency and of uniform consistency in order that orderly laying of the bricks can be effected. If the mortar is too hard, proper adhesion and high strength cannot be obtained between the courses of brick, and if too thin, the mortar will tend to run down the bricks. The bricks laid thereon also will sink excessively therein until contacting bricks therebelow, while squeezing out most of the mortar therebetween. It is also essential that all of the mortar be of uniform consistency because otherwise bricks in some locations will settle in the mortar bed more than in others, throwing them out of horizontal alignment. The mortar bed itself, of course, must also be spread uniformly so as to be of uniform thickness to enable the brick laid thereon to be level. Further, when the bricks are placed on the bed of mortar, each is tamped lightly in order to maintain the bricks level and to insure that all portions thereof are in contact with the bed. This must be done uniformly with all of the bricks to maintain horizontal alignment, since if some bricks are tamped harder or longer than others, they will settle more in the bed. These aspects of bricklaying, which are not all inclusive, place the art of bricklaying, as is now known, in a class above the average layman and beyond the skill he possesses.

Besides rendering bricks difficult to lay, the thick mortar also has other disadvantages. The mortar is the weakest point of the wall and also is subjected to weathering and crumbling over a period of time. In addition, the bricks with which the mortar is used must be relatively porous in order for an effective bond to be obtained between the mortar and the contiguous bricks since some of the mortar must soak into the bricks to obtain a good bond therebetween. This means that the wall itself will not have the degree of water-tightness which could otherwise be obtained if denser, less porous bricks could be employed.

The present invention relates to a new concept in bricks and in bricklaying which brings the skill of bricklaying within the scope of skill possessed by the average person. The new brick is molded or cast of compacted concrete in order to obtain smoother and more dense surfaces thereon. Further, by so molding the bricks and by curing them through the expedient of autoclaving, the dimensions of the brick are more accurate and can be maintained within close, predictable tolerances. In fact, it has been found that the bricks must be made of molded concrete in order to obtain a sufficient degree of accuracy of the dimensions and sufficient flatness of the planar surfaces of the brick which are in contact with one another. While there has been some attempt heretofore to use blocks having grooves along certain edges, molded concrete bricks with edge grooves which enable the concrete bricks to have the appearance of conventional bricks when laid have not heretofore been suggested. Fire clay bricks have been found to be unsuitable for making bricks according to the invention since they do not retain a sufficient degree of smoothness or dimensional stability to be used in the proposed manner. While concrete blocks have been heretofore proposed to be laid in substantially surface-to-surface relationship, these have been cut by hand to achieve the desired degree of flatness and accuracy. Such renders the blocks too expensive for commercial markets. Also, the surfaces of the cut concrete blocks tend to be open and less dense so as to absorb more adhesive, cement, or other bonding agent than otherwise. In contrast, in the brick according to the invention, the surfaces achieved by the casting or molding are extremely dense and smooth and the overall brick has a higher density than otherwise possible.

With the flat, dense surfaces, the bricks can then be laid more closely together with a thinner layer of mortar, grout, or other bonding agent therebetween and yet still enable an effective bond to be obtained between them. By the use of a thinner layer of bonding material, such as epoxy resin system, the task of bricklaying is greatly simplified and the skill required is substantially reduced. As long as the bricks in the next lower course are horizontal, there is never a problem in laying the bricks in the course thereabove because the thin layer of mortar or bonding material enables them to be easily laid parallel to the bricks therebelow. Further, there is no possibility of tamping the bricks non-uniformly to the extent that they will be thrown out of alignment. The thin bonding layer allows more variation in the consistency of the mortar, if mortar is used, and yet satisfactory results can still be obtained. The thin layer also enables a stronger wall to be built because the bricks now lie substantially in contact with one another without the thick, weaker layer of mortar therebetween. Further, with a resinous bonding agent, denser, more waterproof bricks can be used.

Besides these advantages, the new brick also has an appearance similar to that of conventional bricks which is made possible by grooves formed therein which extend along the upper and lower longitudinally-extending edges of each brick, and at one end where the end surfaces otherwise would meet the front and rear surfaces. The grooves of each brick cooperate with the grooves of adjacent bricks to form, horizontal, longitudinally-extending channels or recesses in which mortar can be placed, if desired, to enable the bricks to achieve an appearance similar to conventional brick structures with conventional mortar joints. In the usual structure, only the channels at the exposed faces of the bricks are filled with mortar, if any are, but the grooves may be formed in both the front and rear faces of the bricks, to enable either face to be exposed. Besides serving to provide a conventional appearance for the bricks, the mortar, if used, also provides an additional seal and thus additional protection from the weather and from moisture.

Probably in the majority of instances, no mortar will be used between the bricks at the faces thereof. With the dense bricks and thin bond, mortar is not essential for strength or for weatherproofing and, when a shadow joint effect is desired for the brick, the mortar is not required for appearance. In such an instance, the vertical gaps between the ends of the bricks in each course preferably are replaced by end grooves or extensions on the bricks. After all the bricks are laid, substantially no tuck-pointing is required, with the grooves formed by the adjacent bricks giving the aforementioned shadow joint appearance.

The bricks according to the invention are made in commercial cement block machines in order that the bricks will have the smooth, dense surfaces and still be produced at reasonable costs. Molds used with the machines usually have from twenty-eight to thirty brick cavities to make that number of bricks in each operation, and 50,000 to 100,000 bricks a day. The concrete is compacted in the molds under high pressures to provide the smooth, dense surfaces having highly accurate, predictable dimensions. The mold commonly is subsequently stripped from the brick, leaving them in on-end positions on a pallet, after which they can be cured and stored. The completed bricks have a production taper, being very slightly thicker at one end, the lower one when on the pallet, than at the other. This is due to a slight slumping of the concrete with the brick in the on-end position, or to a slight taper of the mold cavities, or both. The actual difference in thickness is minute, perhaps $\frac{1}{32}$ inch to $\frac{1}{64}$ inch, and is not apparent to the naked eye. However, if the bricks should be laid, course after course, in a manner such that the thick ends lie over one another, the thickness differential can be sufficient to visibly disturb the horizontal linearity of the bricks.

The bricks according to the invention are designed in a manner such that they can easily be laid with the thick and thin ends staggered to prevent the possibility of the aforementioned thickness differential accumulation. This is achieved by employing vertical end grooves at one end only of the brick and by placing the bricks with the grooved ends in a common direction, when used as stretcher bricks. Two types of corner bricks are then required for adjacent courses, as will be discussed subsequently. These bricks can be molded in special brick cavities or the stretcher brick can be cut, preferably at the job site by brick saws or abrasive wheels, to provide the proper end grooves.

It is, therefore, a principal object of the invention to provide an improved brick and an improved method of laying the same.

Another object of the invention is to provide a brick which can be laid by one possessing average skill and no previous experience.

Still another object of the invention is to provide a brick wall which is stronger than those employing conventional mortar joints.

A further object of the invention is to provide a brick wall which is more water resistant than walls heretofore known.

Yet another object of the invention is to provide a new brick and a method of laying the same which have the advantages discussed above.

Other objects and advantages of the invention will be apparent from the following detailed description of a preferred embodiment thereof, reference being made to the accompanying drawings, in which:

FIG. 1 is a view in perspective of a stretcher brick embodying the invention;

FIG. 2 is a top view of the brick shown in FIG. 1;

FIG. 3 is a left end view of the brick of FIGS. 1 and 2;

FIG. 4 is a front view in elevation of the same brick;

FIG. 5 is a right end view of the brick of FIGS. 1–4;

FIG. 6 is a view in perspective of one corner brick which can be molded separately or cut from the brick of FIGS. 1–5 by removing the portion shown in dotted lines;

FIG. 7 is another corner brick which also can be molded separately or cut from the brick of FIGS. 1–5 by removing the portion shown in dotted lines;

FIG. 8 is a view in perspective of a brick structure or wall made with the stretcher bricks and corner bricks of FIGS. 1–7;

FIG. 9 is a plan view of the first course of bricks shown in FIG. 8; and

FIG. 10 is a plan view of the second course of bricks shown in FIG. 8, with the upper course removed.

Referring particularly to FIGS 1–5, a brick according to the invention is indicated at 12 and is preferably made of concrete to enable close dimensions and smooth surfaces to be attained. The brick 12 includes front and rear surfaces 14 and 16 which are equal in size and shape to the corresponding surfaces of conventional bricks. Top and bottom surfaces or lands 18 and 20 can also be of the same size and shape as the corresponding surfaces of conventional bricks although they can be narrower or wider without affecting the appearance of the brick 12 when laid in a wall or other structure. The front and rear surfaces 14 and 16 are approximately parallel to one another and lie perpendicularly to the upper and lower surfaces 18 and 20, which are approximately parallel to one another.

Grooves 22 and 24 are formed at the edges where the front surface 14 would otherwise meet the top and bottom surfaces 18 and 20. Similarly, grooves 26 and 28 are formed where the rear surface 16 would otherwise meet the top and bottom surfaces 18 and 20. All four of the longitudinal grooves 22–28 are not essential, either the grooves 22 and 24 or the grooves 26 and 28 being sufficient. However, by employing grooves on both the front and back of the brick, either surface 14 or 16 can be exposed in the wall in which the brick is laid. Consequently, in the event that one face of the brick is marred or otherwise imperfect due to manufacture or handling, the other side can still be used effectively.

The brick 12 additionally has two vertical end grooves 30 and 32 which are of the same depth as the grooves 22–28 but are twice as wide. The end grooves in effect form an extension on the brick beyond an end of the front and rear surfaces 14 and 16. Again, only one of the grooves 30 and 32 is required, but two are preferred for the same reason discussed above. Any of the grooves can be concave in cross section rather than having straight surfaces parallel to the front and back surfaces and the upper and lower surfaces of the brick, if desired.

As previously discussed, the brick 12 preferably are molded in a concrete block machine with bars in the mold cavities at the appropriate locations to form the longitudinal grooves 22–28 and with bars at an end of each of the cavities to form the end grooves 30 and 32. After the bricks are molded, and the mold stripped therefrom, the bricks remain on a pallet in an on-end position with a planar end 34 resting on the pallet and a grooved end 36 thereabove. The bricks are slightly tapered with the planar end 34 being perhaps $\frac{1}{32}$ to $\frac{1}{64}$ inch thicker than the grooved end 36. This is due to a slight taper of the mold cavity to aid in stripping the molded concrete therefrom, or due to a slight slumping of the concrete when the bricks are in the on-end position, or both.

To further illustrate the invention, all of the bricks are shown with arrows or triangles on the front surfaces with the wide end indicating the thicker end of the brick and the pointed end indicating the thinner end of the brick. While the difference in thickness for each brick is not discernible to the naked eye, if the bricks are laid with the thicker ends consistently over thicker ends, a substantial unevenness will result after several courses are laid, which will be readily noticed and totally unacceptable. However, if the bricks are laid so that the thick ends overlie thin ends of the bricks immediately therebelow and vice versa, no accumulation of the thickness differential will result.

The bricks can be laid with a thin layer of grout therebetween which can consist essentially of a slurry of cement and water. However, other bonding agents such as certain resinous materials can also be used and often are preferred. The bonding agent can be applied to the bricks 12 by coating the surfaces 18 and 20 with a paint brush, or by using a caulking gun or the like. It also can be applied by dipping the upper and lower surfaces in a shallow pan of the agent or several thin strips of the bonding agent can be applied at one time by a suitable dispenser to the upper surfaces of all bricks in a course before the next bricks are laid. A thin layer of the bonding agent is thereby provided between the bricks in adjacent courses to achieve a strong and waterproof bond.

With the thin layer between the bricks, there is no possibility that some of the bricks will settle more than others and thus be thrown out of alignment, or, if the bonding agent is thinner in some parts than in others, the bricks cannot settle more at those parts. In addition, the bricks need not be tamped when placed on the bonding agent of the lower bricks to the extent necessary with conventional bricks and mortar to assure proper contact therebetween. Because the mortar bed between conventional bricks is usually $\frac{3}{8}$ inch thick, each of the longitudinal grooves of the brick has a height of approximately $\frac{3}{16}$ inch while the width of the end grooves is substantially twice this or approximately $\frac{3}{8}$ inch. In this manner two adjacent longitudinal grooves form a $\frac{3}{8}$ inch horizontal channel and one vertical groove forms a $\frac{3}{8}$ inch channel with the planar end of the next brick in the same course. Actually, the grooves are made slightly less than these dimensions because the thin layer of bonding agent will have a thickness of $\frac{1}{32}$ to $\frac{1}{16}$ inch. The front, exposed surfaces of the bricks thus are equally spaced from one another in both horizontal and vertical directions with the spacing equal to that of conventional bricks.

The depth of the grooves depends in part upon the height thereof and, as shown, the depth is approximately twice the width or thickness of the grooves so that the channels formed between the bricks by two grooves will have substantially the same height and depth. In any event, the resulting channels formed by the grooves must be deep enough to hold the mortar, if used, and yet should not be so deep that the surfaces 18 and 20 are unduly narrow, which would reduce the strength of the resulting structure and the strength of the bond between the surfaces because of their smaller area. The depth of the grooves preferably is not less than about five percent nor more than about twenty-five percent of the width of the brick.

As noted, while mortar can be used in the channels between the bricks formed by the grooves, the entire job of tuck-pointing and filling the grooves with mortar can be eliminated to further reduce the cost of laying the brick, whether done by the novice or by the professional bricklayer. Such a wall is termed a mortarless wall although some mortar may actually be used as a bonding agent or incertain gaps between the bricks. The bonding agent between the layers of bricks and between the ends thereof provides sufficient water- and weather-tightness that no mortar is required in the brick channels for these purposes and the additional mortar contributes nothing to the strength of the joint. By leaving the channels empty, a shadow-type joint is achieved similar to that which often is used in conventional bricklaying techniques. Further, there is no danger of mortar crumbling or eroding so that the structure must be tuck-pointed again after perhaps twenty or thirty years.

Special bricks are preferred at the corners of the structure to provide the proper groove and channel arrangement for the wall. It has been found that while one type of corner brick, such as that shown in either FIGS. 6 or 7, will provide the proper grooves and channels, either of the corner bricks used along will cause an unevenness in the height of a course when several courses are laid. This can be overcome by grinding away part of the upper and lower surfaces of the bricks where too many laid with the thick ends overlapping, and by placing said or other filler in the bonding agent where a number of thinner brick ends overlie one another. In a preferred form, however, two types of corner bricks can be used with one type in one course and the other type in the next course to completely alleviate any problems of unevenness.

A corner brick 38 in FIG. 6 is employed for this purpose, this corner brick being designated a left-hand corner brick for purposes of identification. The brick 38 can be molded or cast separately or can be cut from one of the bricks 12. When the bricks are cast separately, a problem of handling and inventory results. Consequently, it has been found to be easier to cut the bricks 38 from the bricks 12 at the job site by means of a specially designed abrasive wheel or brick saw. This can be accomplished by cutting off the brick extension at the grooved end along a line extending perpendicularly across the brick at the ends of the front and rear surfaces 14 and 16, leaving a shorter end 40. Upper and lower transverse grooves 42 and 44 can be cut in the upper and lower surfaces 18 and 20 of the brick 38. With a specially designed tool, the brick 38 can be cut very quickly on the job site.

A second corner brick 46, shown in FIG. 7, can be used in the courses adjacent the courses employing the brick 38, with the two types of brick alternating in the courses. The brick 46, a right-hand corner brick, can be cut from the brick 12 and, in fact, cannot be cast in a conventional concrete block machine since grooves cannot be formed at both ends of the brick in the cavities of the mold. The brick 46 is simply made by cutting end grooves 48 and 50 in the thick end 34 of the brick 12 with no further modification being required.

Referring to FIGS. 8–10, the bricks are shown in a wall structure laid in courses designated A and B with a thin bonding material 54, shown in FIGS. 9 and 10, being between the courses and between abutting surfaces of adjacent bricks. The stretcher bricks in each of the courses A and B extend in common directions with the thick ends overlying the thin ends of the stretcher bricks in the next course and vice versa. In the course A, as shown in FIGS. 8 and 9, the left-hand corner bricks 38 are employed with the transverse grooves 42 and 44 being exposed. Since the bricks 38 are slightly shorter than the other bricks, by the width of the grooves 30 and 32, a slight gap results between the left-hand corner brick 38 and one of the adjacent stretcher bricks 12. This gap can be filled with mortar or other bonding agent as the bricks are laid. In practice, several of the stretcher bricks can be spaced slightly farther apart than ordinarily done with a heavier layer of the bonding agent then applied between them.

In the courses B, the so-called right-hand corner bricks 46 are employed with the transverse grooves 48 and 50 being exposed along with the thick end 34.

With the above arrangement, at each corner, a thick end of a brick overlies a thin end and vice versa, which cannot possibly result if only one type of corner brick is used. While, as pointed out above, if one corner brick is used, the discrepancy in thickness can be overcome by slight grinding of the upper and lower surfaces of the brick and by employing sand or a thicker layer of the bonding agent, the use of the two types of corner brick is preferred to eliminate unevenness more effectively.

As noted, the wall made with the three bricks 12, 38, and 46 does not require tuck-pointing with the extra motar or bonding agent only being used in the gaps between certain bricks in the course A and at the notches formed by the longitudinal grooves of the corner bricks and the adjacent ends of the stretcher bricks. Rather than using mortar in the gaps, foam filler blocks can be employed if desired as discussed in my application Ser. No. 429,952.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. A structural corner brick capable of being used in a mortarless wall, said brick comprising a body having front and rear approximately parallel surfaces, the front surface being substantially the same size and shape as a front surface of a conventional brick, upper and lower approximately parallel, planar surfaces generally perpendicular to the front and rear surfaces of the brick, and two parallel, planar end surfaces, one of said end surfaces meeting said front and rear surfaces and said upper and lower surfaces along straight, perpendicular edges, grooves extending longitudinally of said body at the edges where the front and rear surfaces otherwise would meet the upper and lower surfaces, the end surface opposite the one end surface extending completely to the front surface of said brick and forming transverse end grooves with the upper and lower surfaces of said brick, the width of all of said grooves being substantially equal and the depth of all of said grooves being substantially equal.

2. A brick structure comprising at least two courses of solid bricks united with thin bonding material between adjacent surfaces thereof one course including stretcher bricks and a first corner brick and the second course including the same stretcher bricks and a second corner brick, each of said stretcher bricks comprising a body having front and rear surfaces, the front surface being substantially of the same size and shape as a front surface of a conventional brick, upper and lower planar surfaces generally perpendicular to the front and rear surfaces, and two parallel end surfaces, one of said end surfaces meeting said front and rear surfaces of said upper and lower surfaces along straight perpendicular edges, grooves extending longitudinally of said body at the edges where the front surface otherwise would meet the upper and lower surfaces, the end surface opposite the one end surface extending completely to the upper and lower surfaces of said brick and forming an end groove with said front surface the width of said end groove being substantially twice the width of the longitudinal grooves and communicating with said longitudinal grooves, all of said bricks in both of said courses extending in a common direction with said end grooves at the same ends of said bricks, the bricks in the first course being staggered with respect to the bricks in the second course so that substantially half of each brick toward the end groove in the first course overlies substantially half of the one of the stretcher bricks in the second course toward the end not having the groove; said first corner brick comprising a body having front and rear surfaces, the front surface being substantially the same size and shape as a front surface of a conventional brick, upper and lower planar surfaces, two parallel end surfaces, grooves extending longitudinally of said body at the edges where the front surface otherwise would meet the upper and lower surfaces, one end surface extending completely to the front surface of said brick and forming transverse end grooves with the upper and lower surfaces of said brick, the width of all of said grooves being substantially equal, the grooved end of one of said stretcher bricks substantially abutting the one end of said first corner brick; said second corner brick comprising a body having front and rear surfaces, upper and lower planar surfaces, and end surfaces one of said end surfaces forming transverse end grooves with said upper and lower surfaces, the other of said end surfaces forming a vertical end groove with said front surface, the width of said vertical end groove being substantially twice the width of the longitudinal grooves and communicating with said longitudinal grooves, said transverse end grooves being substantially the same width as said longitudinal grooves, the grooved end of a second one of said stretcher bricks substantially abutting the rear surface of said second corner brick with the front surface of said second stretcher brick being co-planar with said one surface of said second corner brick.

3. A brick structure comprising a composite of three types of bricks united with thin bonding material between adjacent surfaces thereof, including a stretcher brick, a first corner brick, and a second corner brick, said stretcher brick comprising a body having front and rear surfaces, the front surface being substantially of the same size and shape as the front surface of a conventional brick, upper and lower generally parallel, planar surfaces, and two parallel end surfaces, grooves extending longitudinally of said body at the edges where the front surface otherwise would meet the upper and lower surfaces, one end surface forming an end groove with said front surface, the width of said end groove being substantially twice the width of the longitudinal grooves; said first corner brick comprising a body having front and rear surfaces, the front surface being substantially the same size and shape as a front surface of a conventional brick, upper and lower planar surfaces, two parallel end surfaces, grooves extending longitudinally of said body at the edges where the front surface otherwise would meet the upper and lower surfaces, one end surface extending completely to the front surface of said brick and forming transverse end grooves with the upper and lower surfaces of said brick, the width of all of said grooves being substantially equal; and said second corner brick comprising a body having front and rear surfaces, upper and lower planar surfaces, one of said end surfaces forming transverse end grooves with said upper and lower surfaces, the other of said end surfaces forming a vertical end groove with said front surface, the width of said vertical end groove being substantially twice the width of the longitudinal grooves and communicating with said longitudinal grooves, said transverse end grooves being substantially the same width as said longitudinal grooves.

4. A course of bricks comprising a composite of two bricks united with thin bonding material for use in a brick structure, including a stretcher brick and a corner brick, said stretcher brick comprising a body having front and rear surfaces, the front surface being substantially of the same size and shape as a front surface of a conventional brick, upper and lower planar surfaces generally perpendicular to the front and rear surfaces, and two parallel end surfaces, one of said end surfaces meeting said front and rear surfaces and said upper and lower surfaces along straight perpendicular edges, grooves extending longitudinally of said body at the edges where the front and rear surfaces otherwise would meet the upper and lower surfaces, the end surface opposite the one end surface extending completely to the upper and lower surfaces of said brick and forming end grooves with said front and rear surfaces, the width of said end grooves being substantially twice the width of the longitudinal grooves and communicating with said longitudinal grooves, all of said grooves being of the same depth; said corner brick comprising a body having front and rear surfaces, the front surface being substantially the same size and shape as the front surface of a conventional brick, upper and lower planar surfaces, two parallel end surfaces, grooves extending longitudinally of said body at the edges where the front and rear surfaces otherwise would meet the upper and lower surfaces, one end surface extending completely to the front surface of said corner brick and forming transverse end grooves with the upper and lower surfaces thereof, the width of all of said grooves being substantially equal.

5. A brick structure comprising at least two structural stretcher bricks, each of said bricks comprising a solid body having front and rear approximately parallel surfaces, the front and rear surfaces being substantially of the same size and shape as the front and rear surfaces of a conventional brick, upper and lower approximately parallel, planar surfaces generally perpendicular to the front and rear surfaces, and two parallel, planar end surfaces, a first of said end surfaces meeting said front and rear surfaces and said upper and lower surfaces along straight, perpendicular edges, grooves extending longitudinally of said body at the edges where the front and rear surfaces otherwise would meet the upper and lower surfaces, the second end surface opposite the first end surface extending completely to the upper and lower surfaces of said brick and forming end grooves with said front and rear surfaces, the width of said end grooves being substantially twice the width of the longitudinal grooves and communicating with said longitudinal grooves, all of said grooves being of the same depth, said bricks being positioned with the first end surface of one brick lying adjacent the second end surface of an adjacent brick, and with thin bonding material between the adjacent surfaces of said stretcher bricks.

References Cited

UNITED STATES PATENTS

| | | | |
|---|---|---|---|
| 310,088 | 12/1884 | Sherry | 52—437 |
| 604,325 | 5/1889 | Hopkins | 52—603 |
| 1,006,298 | 10/1911 | Sexton | 52—316 |
| 1,501,479 | 7/1924 | Davis | 25—45 |
| 1,855,987 | 4/1932 | Rammer | 52—604 |
| 2,018,541 | 10/1935 | Austin | 52—100 |
| 2,112,241 | 3/1938 | Hyde | 52—309 |
| 2,763,909 | 9/1956 | Guimont | 249—76 |
| 3,025,641 | 3/1962 | Ahtiainen | 52—415 |
| 3,200,465 | 8/1965 | Lassman | 25—27 |

FOREIGN PATENTS

| | | |
|---|---|---|
| 149,484 | 8/1920 | Great Britain. |
| 2,744 | 7/1926 | Australia. |
| 801,406 | 7/1951 | Germany. |
| 914,682 | 6/1946 | France. |
| 1,173,781 | 10/1958 | France. |

OTHER REFERENCES

Popular Mechanics, October 1963, Scientific Library, Call No. T1.

HENRY C. SUTHERLAND, *Primary Examiner.*

JAMES L. RIDGILL, JR., *Assistant Examiner.*

U.S. Cl. X.R.

52—309, 316, 415, 605